United States Patent
Pepin et al.

[11] Patent Number: 6,151,131
[45] Date of Patent: *Nov. 21, 2000

[54] PRINT SYSTEM WITH DEFERRED JOB ASSEMBLY FEATURE

[75] Inventors: Louis O. Pepin, Pittsford; David C. Robinson, Penfield; Michael E. Farrell, Ontario, all of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/963,303

[22] Filed: Nov. 3, 1997

[51] Int. Cl.⁷ .................................................. G06F 15/00
[52] U.S. Cl. ......................................... 358/1.13; 358/1.18
[58] Field of Search ..................................... 395/101, 112, 395/114, 115, 116, 117, 113; 345/433; 707/517, 522, 525, 530, 908, 527, 526, 910, 907; 283/66.1; 358/401, 403, 449, 462, 1.13, 1.15, 1.16, 1.17, 1.18, 1.14, 1.1, 1.2, 1.4, 1.5, 1.6, 1.9, 1.11; 364/478.03, 478.14; 382/305, 306

[56] References Cited

U.S. PATENT DOCUMENTS

| | | | |
|---|---|---|---|
| 4,248,528 | 2/1981 | Sahay | 355/14 |
| 4,763,161 | 8/1988 | Forest et al. | 355/14 |
| 4,843,571 | 6/1989 | Notermans et al. | 364/519 |
| 4,970,554 | 11/1990 | Rourke | 355/202 |
| 4,987,477 | 1/1991 | Ojha | 355/204 |
| 5,081,494 | 1/1992 | Reed et al. | 355/202 |
| 5,243,381 | 9/1993 | Hube | 355/204 |
| 5,436,730 | 7/1995 | Hube | 358/401 |
| 5,479,587 | 12/1995 | Campbell | 395/116 |
| 5,579,087 | 11/1996 | Salgado | 355/202 |
| 5,732,219 | 3/1998 | Blumer et al. | 709/227 |
| 5,757,379 | 5/1998 | Saito | 345/433 |
| 5,845,302 | 12/1998 | Cyman, Jr. et al. | 707/517 |

*Primary Examiner*—Dov Popovici
*Attorney, Agent, or Firm*—Gary B. Cohen; Paul F. Daebeler

[57] ABSTRACT

A method of developing a job for output with an output subsystem is provided. The method includes generating a first electronic representation of a first image at a first time, reading a subset of placemarking instructions at a second time, generating a second representation of a second image at a third time, wherein the second time is after the first time but before the third time. At a fourth time, which fourth time is after the first, second and third times, a selected function is performed relative to a third electronic representation of a third image in response to the reading of the subset of placemaking instructions.

16 Claims, 9 Drawing Sheets

PRINT SYSTEM WITH DEFERRED JOB ASSEMBLY FEATURE

BACKGROUND AND MATERIAL DISCLOSURE STATEMENT

The present invention relates generally to a technique for processing a job in a printing system and, more particularly to a system in which deferred assembly of a job is facilitated through the use of one or more place holders provided with the job.

Electronic printing systems typically include an input section with an image capture subsystem, a controller, sometimes referred to as an electronic subsystem and an output section or print engine. In one type of electronic printing system, manufactured by Xerox Corporation, known as the DocuTech electronic printing system ("DocuTech" is a trademark used by "Xerox Corporation in the sale of printing systems") a job can be inputted to the input section from, among other sources, a network or scanner. An example of an input section with both network and scanner inputs is found in U.S. Pat. No. 5,170,3402 to Prokop et al. (Issued: Dec. 8, 1992).

When a scanner is employed to generate the job, image bearing documents are scanned so that the images therein are converted to image data for use in making prints. When a network is used to generate the job, a stream of data, including a various job related instructions and image data, expressed in terms of a page description language is captured, decomposed and stored for printing. As is known, a network job can have its origin in a remote client, such a work station, or a print server with a storage device. Jobs provided at the input section may be stored in a memory section, such as a disk drive.

Electronic printing systems, such as the DocuTech electronic printing system, are typically full featured, and various ones of the features provide one or more functions to be performed on the job. For example, a job captured at the input image section for storage may undergo a significant amount of image processing allowing for the minimization of image related artifacts and various electronic pages may be edited after the job has been suitably stored Pursuant to outputting the stored job, a host of finishing operations, such as stapling, folding, and trimming may be performed on the hardcopy version of the job to optimize its appearance.

In view of the complexity of a given job, it may be desirable to "build" a job on a segment-by-segment basis. In U.S. Pat. No. 5,081,494 to Reed et al. (Issued: Jan. 14, 1992) various parts of a job are merged through use of a job supplement mode. Through this mode, the job supplement function is used to append content to a job as it is being scanned into the printing system. That is, when the job supplement mode is engaged, any number of additional documents or groups of documents maybe scanned in with the job currently being scanned. Upon supplementing the job at the scanner, an END JOB icon is selected, and the supplemented job is stored in a memory section of the printing system.

U.S. Pat. No. 5,579,087 to Salgado (Issued: Nov. 26, 1996) contemplates the technique of constructing a multi-segment print job from multiple local and remote sources on a network using a network interface to identify print job segments and locations of segments on the network by entering a start build print job function at the network interface, identifying each segment of the print job including segment location, specifying print job characteristics such as quantity and quality for each segment, entering an end build print job function at the network interface, and identifying a printing device on the network, whereby each segment of the print job is accessed and distributed to the printing device to complete the multi-segment print job.

It will be further noted that completion of a job may, under certain circumstances be best delayed until a selected event occurs. As disclosed by U.S. patent application Ser. No. 08/1612,648, filed by Farrell et al. on Mar. 8, 1996, a triggering event may constitute the provision of a resource that was not available at a previous time during which a subject job was being developed. In accordance with the '648 Patent Application a job is developed to an extent possible and then set aside in anticipation of a triggering event that is expected to occur at a future time. When the triggering event occurs, development of the job is completed and the job is stored in a memory section. Disclosures relating to delayed execution of a job can be found in U.S. Pat. No. 4,843,5712 Notermans et al. (issued; Jun. 27, 1989) and U.S. Pat. No. 5,436,7302 Hube (issued: Jul. 25, 1995).

In an area related to the build job concept, various segments of a job are implemented through use of a job control sheet. For instance, in U.S. Pat. No. 4,248,528 to Sahay (Issued: Feb. 3, 1981) a control system is disclosed in which pre-printed, operator marked control sheets (otherwise corresponding to regular original documents sheets being copied) are fed together with regular documents by a copier document feeder so as to pass by an optical scanner connected to a corresponding copier controller. The documents sheets are copied in the manner instructed by the control sheets, without requiring manual switch inputs. In the meantime, copying of the control sheet itself is automatically inhibited.

In another instance, U.S. Pat. No. 5,243,381 to Hube (Issued: Sep. 7, 1993) discloses a method including the steps of storing a set electronic pages in a memory section and assigning a unique job identifier to the stored job for indicating a location of the stored job in the memory section. The method further includes the steps of printing the job reference sheet so that the unique job identifier is designated on the job reference sheet in machine readable code and scanning the job reference sheet for reading the machine readable code to retrieve the set of electronic pages from the memory section for printing with a printer.

Other patents directed toward the use of control sheets to provide a job with control instructions include U.S. Pat. No. 4,970,554 to Rourke (issued Nov. 13, 1990) and U.S. Pat. No. 4,987,447 to Ojha (Issued: Jan. 22, 1991). While the '554 Patent employs the use of a bar-coded sheet for pointing to job instructions in memory, the '447 Patent provides a sheet in which the bar codes on a control sheet actually represent control instructions for a job.

Another system for providing a hardcopy document with embedded control instructions is disclosed in U.S. Pat. No. 4,763,161 to Forest et al. (Issued: Aug. 9, 1988). In the system of the '161 Patent, keysheets are interleaved into an original set of document sheets at positions for designating individual document sheets of the set. The keysheets have indicia means for identifying keysheet orientation in the set. An image capture device is used to scan the document sheets and keysheets for reading image information or "marks" associated therewith. When the presence of a keysheet is not sensed, a copy sheet of a first characteristic is supplied and when the presence of a keysheet is sensed, a copy sheet of a second characteristic is supplied.

The implementation of a job is greatly facilitated by the use of interleaved control sheets. Assuming that the developer of a job knows a manner in which the job is to be processed at a given image capture device, appropriate control sheets can be created and interleaved with a document stack. In turn, the supplemented stack can be introduced to the image capture device for processing in accordance with, for example the '582 or '161 Patents. Under certain circumstances, however, the developer of a job may wish to complete a job well after a significant portion of the job has already been captured. For example, the developer may, subsequent to the capture phase, wish to process a portion of the job and/or supplement the job with additional images. It would be desirable to provide an approach in which a job could be captured/structured and then supplemented with placeholding instructions, which placeholding instructions would be used to complete development of the job at a time subsequent to the capture phase.

The present invention is particularly suited for use in a network environment, such as in the context of the world wide web, the internet or the like. Examples of some recent patents relating to network environments of plural remote terminal shared users of networked printers include Xerox Corporation U.S. Pat. Nos. 5,483,653, 5,243,518, 5,226,112, 5,170,340 and U.S. Pat. No. 5,287,194. Some patents on this subject by others include U.S. Pat. Nos. 5,113,355, 5,113, 494 (originally filed Feb. 27, 1987), 5,181,162 5,220,674, 5,247,670; 4,953,080 and U.S. Pat. No. 4,821,107. Further by way of background, some of the following Xerox® Corporation U.S. patents also include examples of networked systems with printers: 5,153,577; 5,113,517; 5,072, 412; 5,065,347; 5,008,853; 4,947,345; 4,939,507; 4,937, 036; 4,920,481; 4,914,586; 4,899,136; 4,453,128; 4,063, 220; 4,099,024; 3,958,088; 3,920,895; and U.S. Pat. No. 3,597,071. Also noted are IBM Corp. U.S. Pat. No. 4,651, 278 and U.S. Pat. No. 4,623,244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . . "; "Xerox System Integration Standard Printing Protocol XSIS 118404", April 1984; "Xerox Integrated Production Publishers Solutions: "Booklet No." 610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, New York, 1988, by Harrington, S. J. and Buckley, R. R.; Adobe Systems Incorporated "PostScript" Language Reference Manual", Addison-Wesley Co., 1990; "Mastering Novell" Netware®", 1990, SYBEX, Inc., Alameda, Calif. by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox Corporation "9700 Electronic Printing System"; the "VP Local Laser Printing" software application package, which, together with the Xerox "4045" or other Laser Copier/Printer, the "6085" "Professional Computer System" using Xerox Corporation "ViewPoint" or "Global-View®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart®" systems, first announced Sep. 13, 1990, are also noted.

Current popular commercial published "systems software" with LAN workstation connections include Novell DOS 7.0, "Windows®" NT 3.1, and IBM OS/2 Version 2.1.

All of the references designated in the above Background section are incorporated herein by reference.

SUMMARY OF THE INVENTION

In accordance with the present invention, there is disclosed a job development method for use in a document processing system with a subsystem for generating electronic representations of respective images from a set of image data in accordance with a set of control instructions. The set of control instructions includes a first subset of control instructions for controlling the development of a first image, a second subset of control instructions for controlling the development of a second image and a subset of image placemarking instructions. The job development method includes the steps of: (a) at a first time, generating a first electronic representation of the first image, with the generating subsystem, by reference to the first subset of control instructions; (b) at a second time, reading the subset of placemarking instructions with the generating subsystem; (c) at a third time, generating a second electronic representation of the second image, with the generating subsystem, by reference to the second subset of control instructions, wherein the second time is after the first time but before the third time; and (d) at a fourth time, electronically performing a selected function relative to a third electronic representation of a third image in response to said reading of (b), wherein the fourth time is after the first, second and third times and prior to output of the job.

In accordance with the present invention, there is disclosed a job development method for use in a document processing system with a subsystem for generating electronic representations of respective images from a set of image data in accordance with a set of control instructions. The set of control instructions includes a first subset of control instructions for controlling the development of a first image, a second subset of control instructions for controlling the development of a second image and a subset of image placemarking instructions. The job development method includes the steps of: (a) at a first time, generating a first electronic representation of the first image, with the generating subsystem, by reference to the first subset of control instructions; (b) at a second time, reading the subset of placemarking instructions with the generating subsystem; (c) at a third time, generating a second electronic representation of the second image, with the generating subsystem, by reference to the second subset of control instructions, wherein the second time is after the first time but before the third time; and (d) at a fourth time, providing a third electronic representation of a third image by reference to the placemaking instructions, wherein the fourth time is after the first, second and third times and prior to output of the job.

DESCRIPTION OF ONE OR MORE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
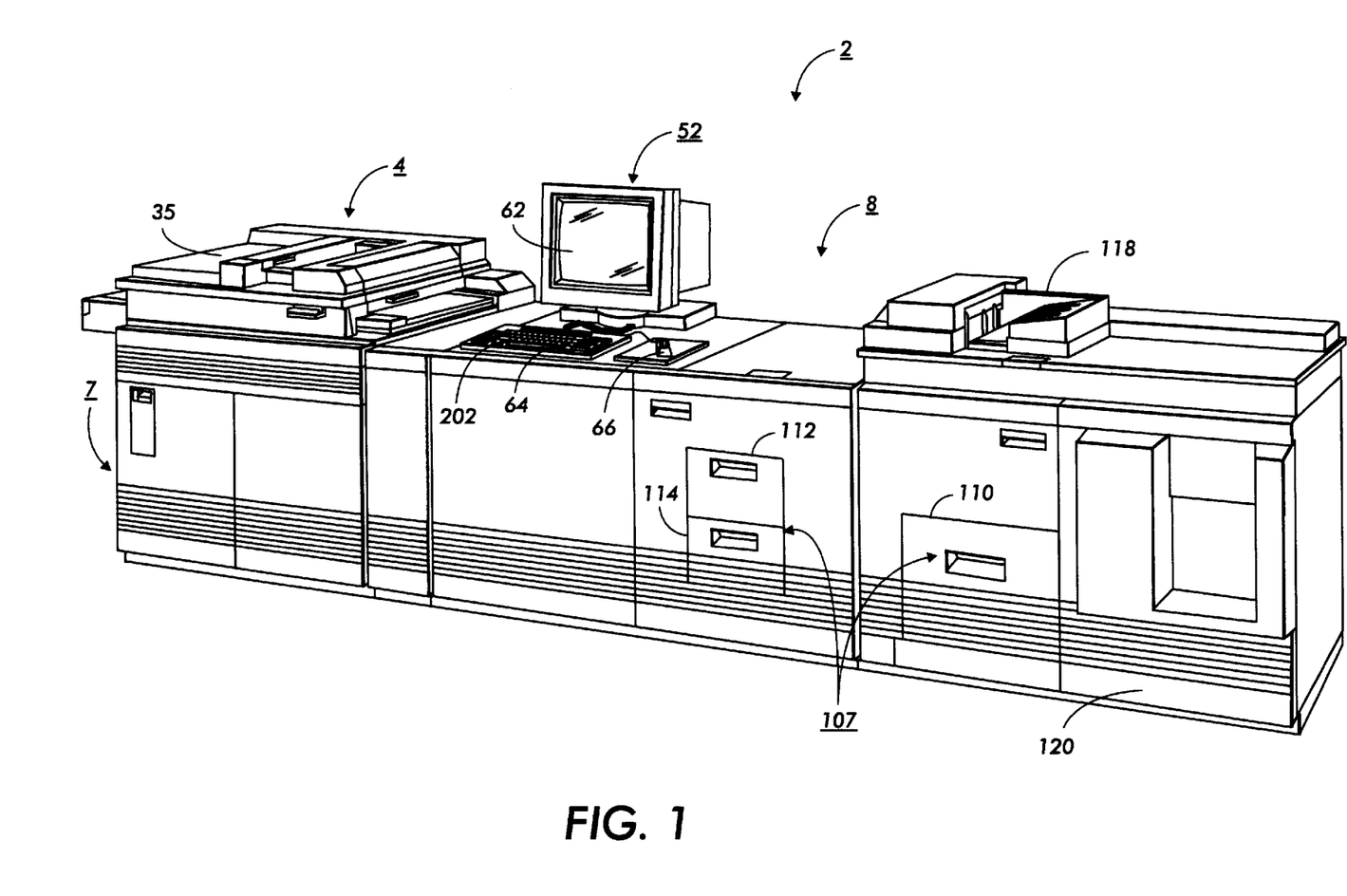
FIG. 1 is a perspective view depicting an electronic printer of the type suitable for use with a deferred job development system of the present invention.
Figure 2:
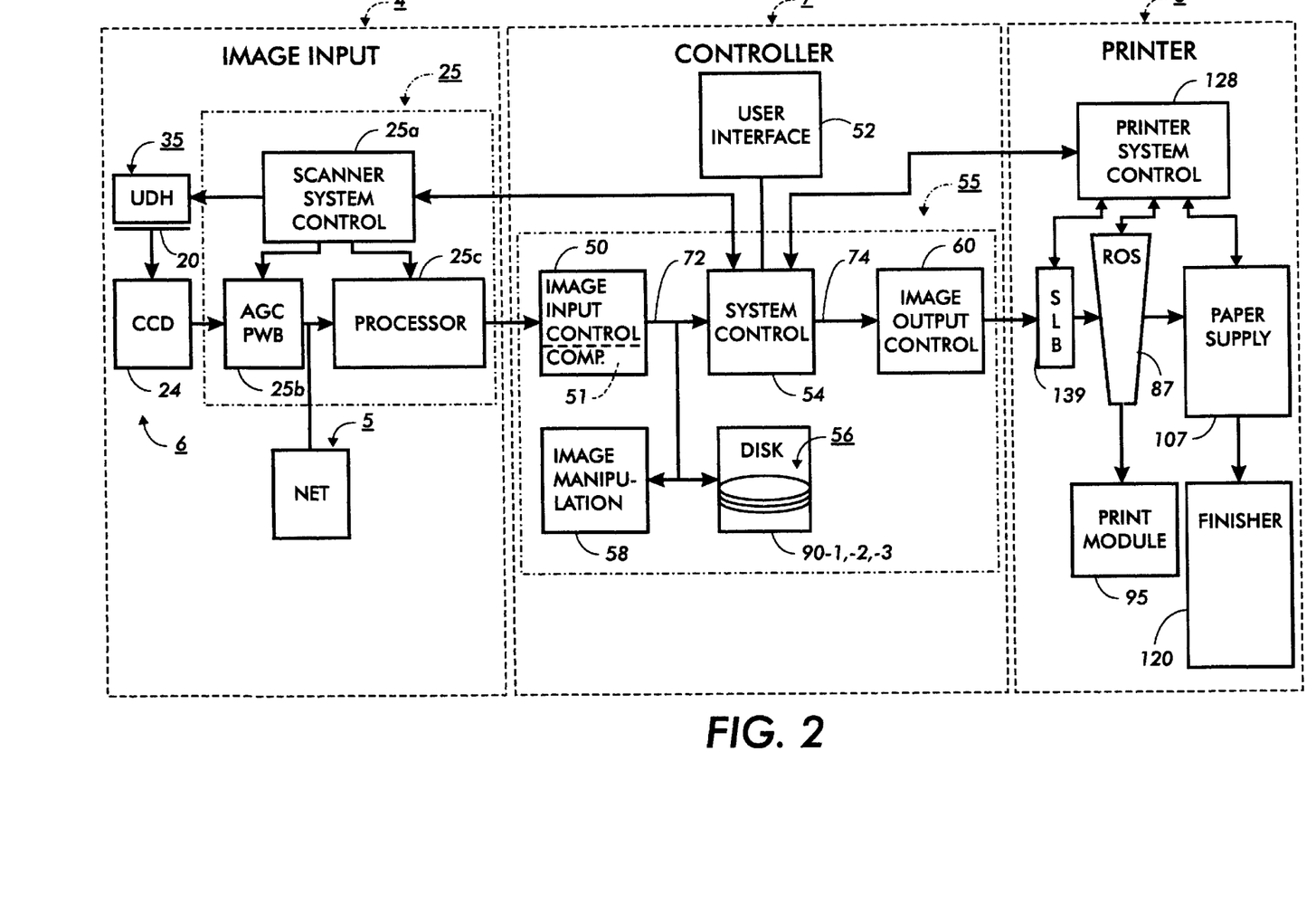
FIG. 2 is a block diagram depicting the major elements of the printer shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be employed in conjunction with electronic display systems, such as CRTs, LCDs, LEDs, etc. or else other image scanning/processing/recording systems, or else other signal transmitting/receiving, recording systems, etc. as well.

For off-site image input, image input section 4 has, in one example, a network 5 with a suitable communication channel such as an EtherNet Registered TM connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 6) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 3:
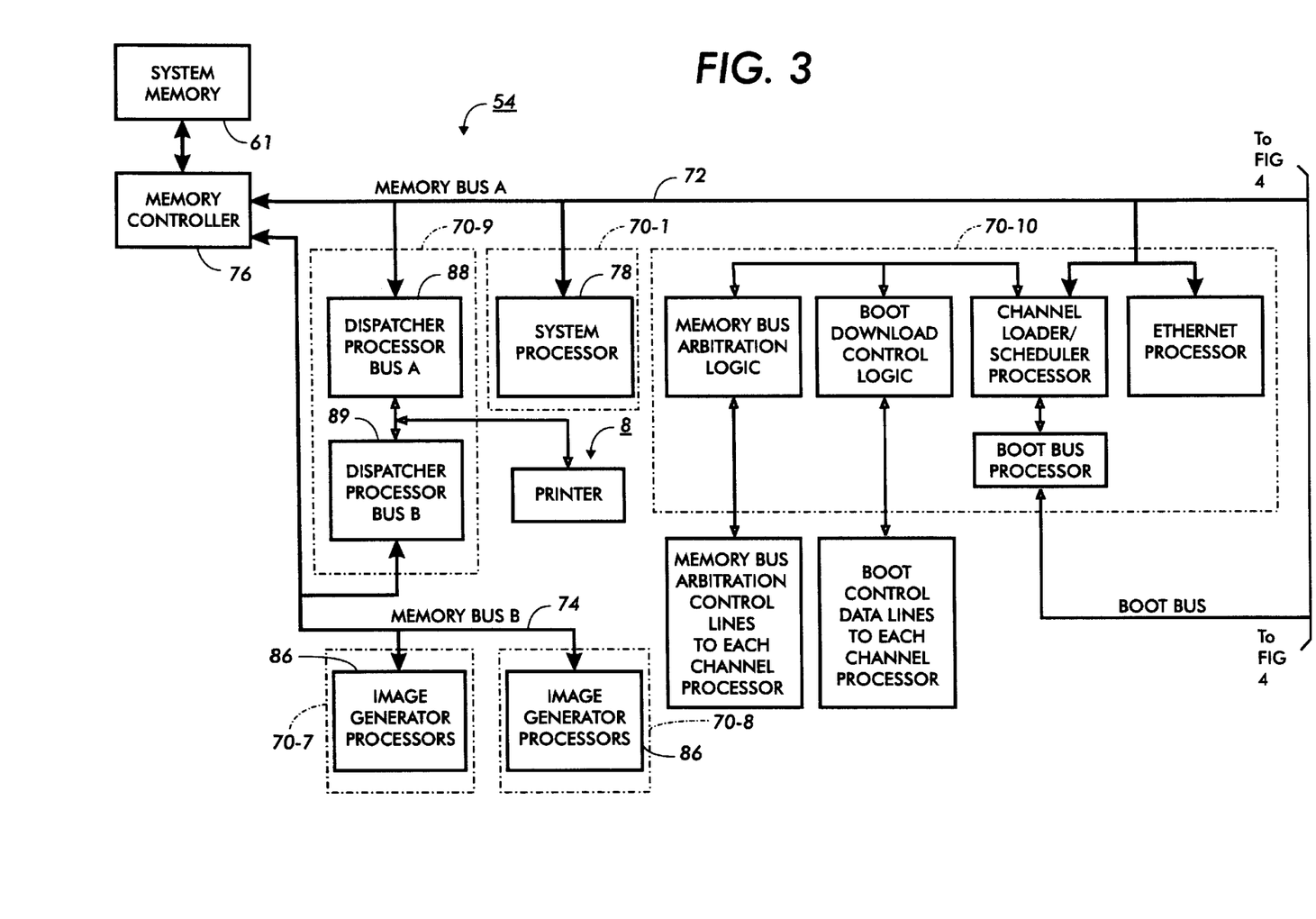
FIGS. 3–5 comprise a schematic block diagram showing the major parts of a controller for the printer shown in FIGS. 1 and 2.
Figure 4:
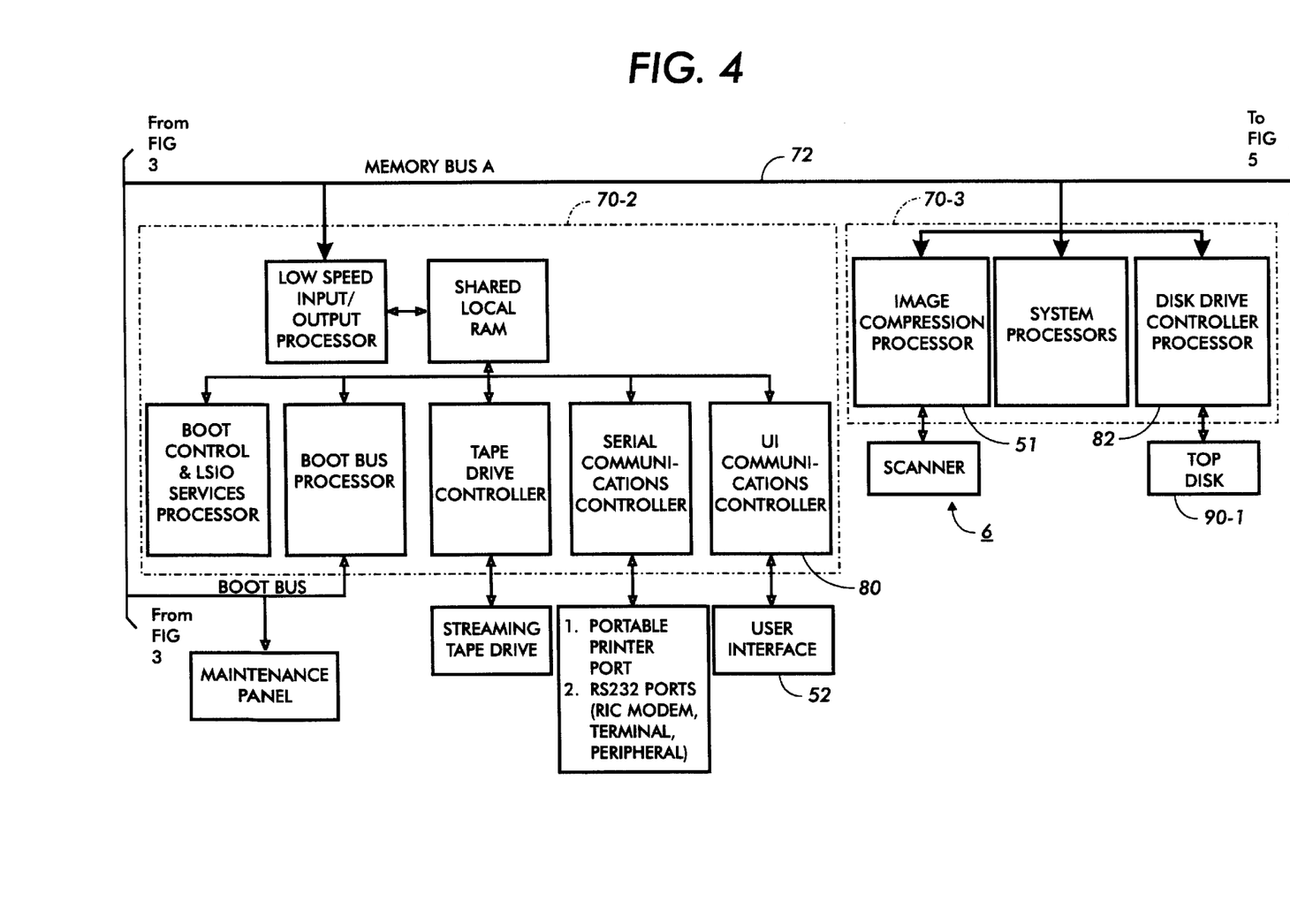
Figure 5:
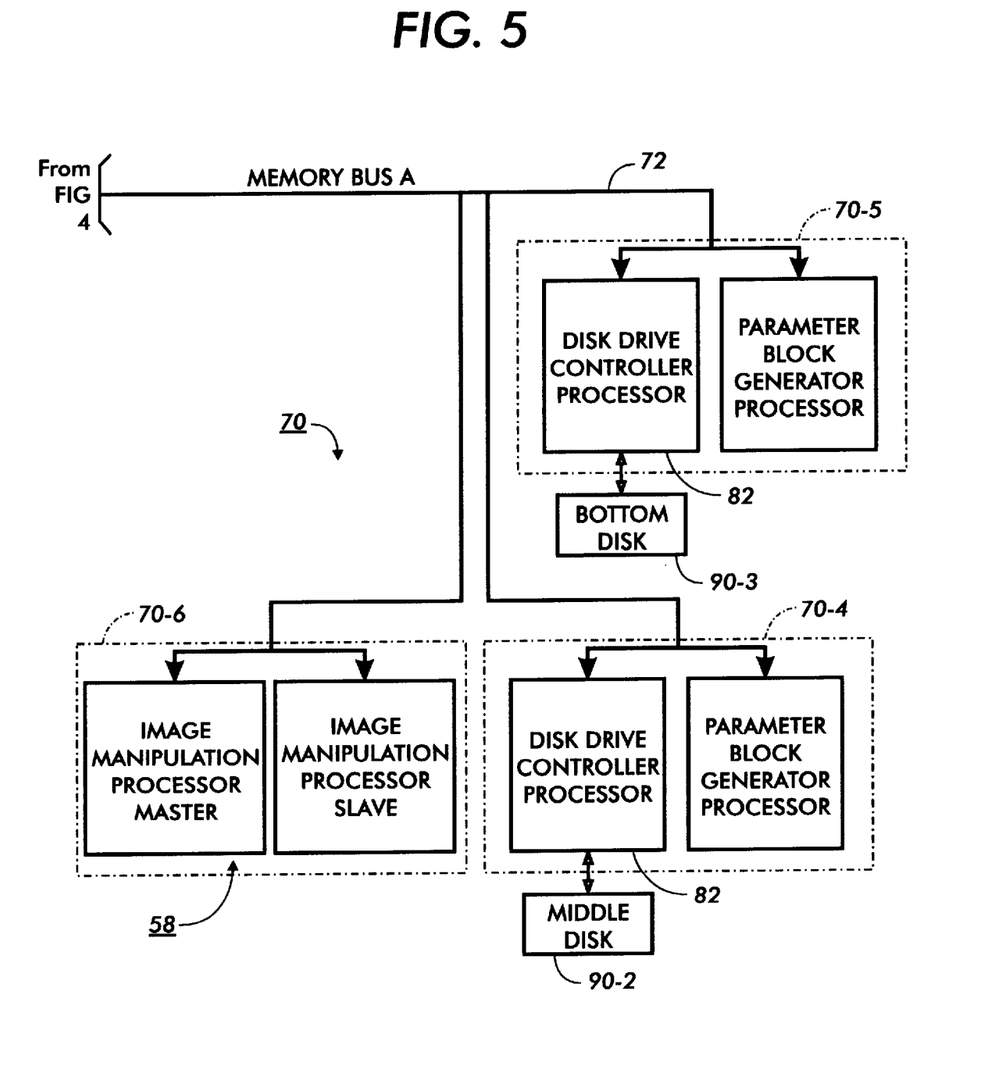

Referring particularly to FIGS. 3–5, image data output to image output control 60 is decorepressed and readied for printing by image generating processors 86 of PWBs 70-7, 70-8. Following this, the data is output by dispatch processors 88, 89 on PWB 70-9 via Scan Line Buffer (SL B) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PW8 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
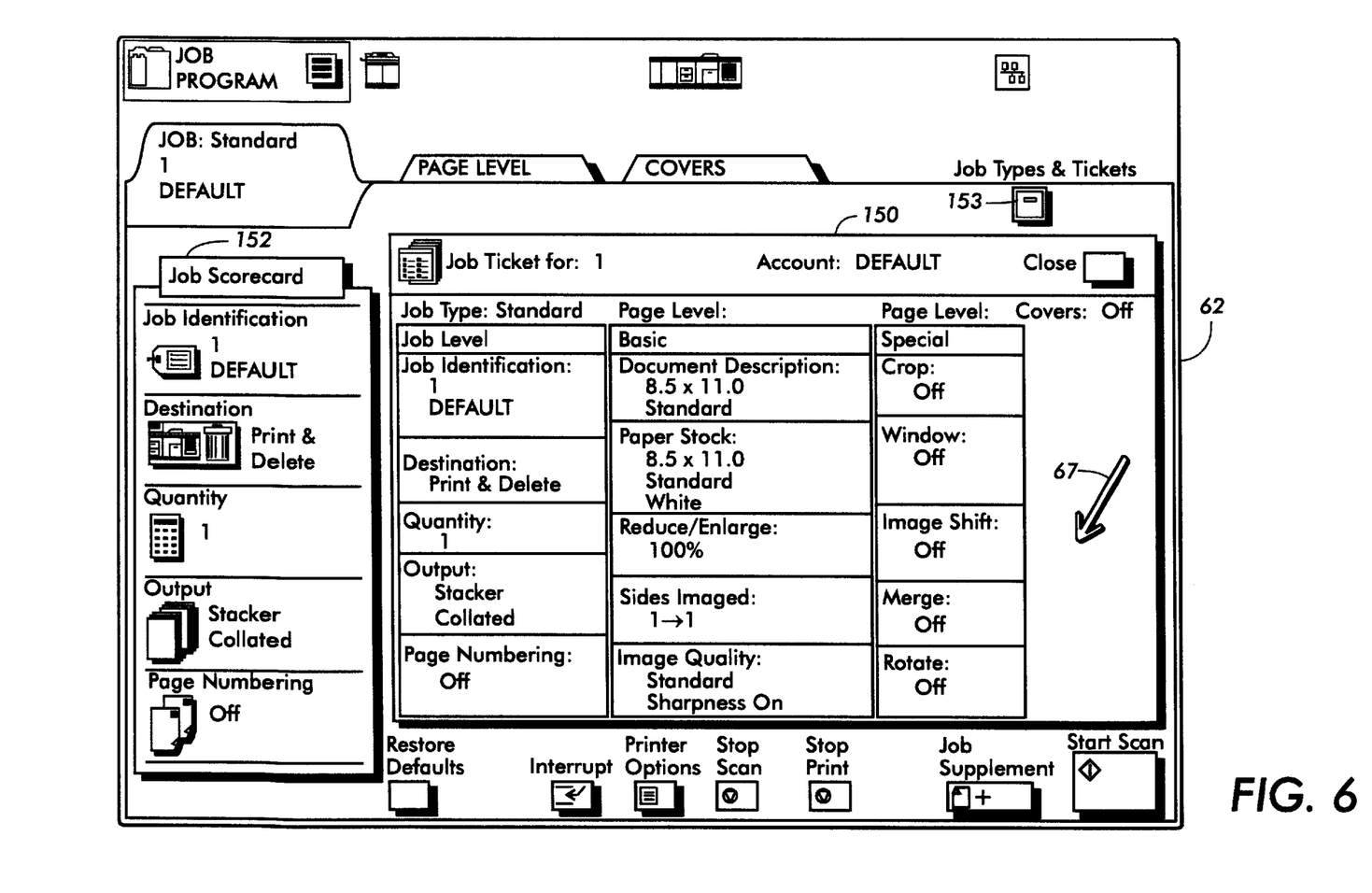
FIG. 6 is a view depicting an exemplary job programming ticket and job scorecard displayed on the User Interface (UI) touchscreen of the printer shown in FIG. 1, the job ticket and job scorecard being associated with a job to be printed.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 153.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Figure 7:
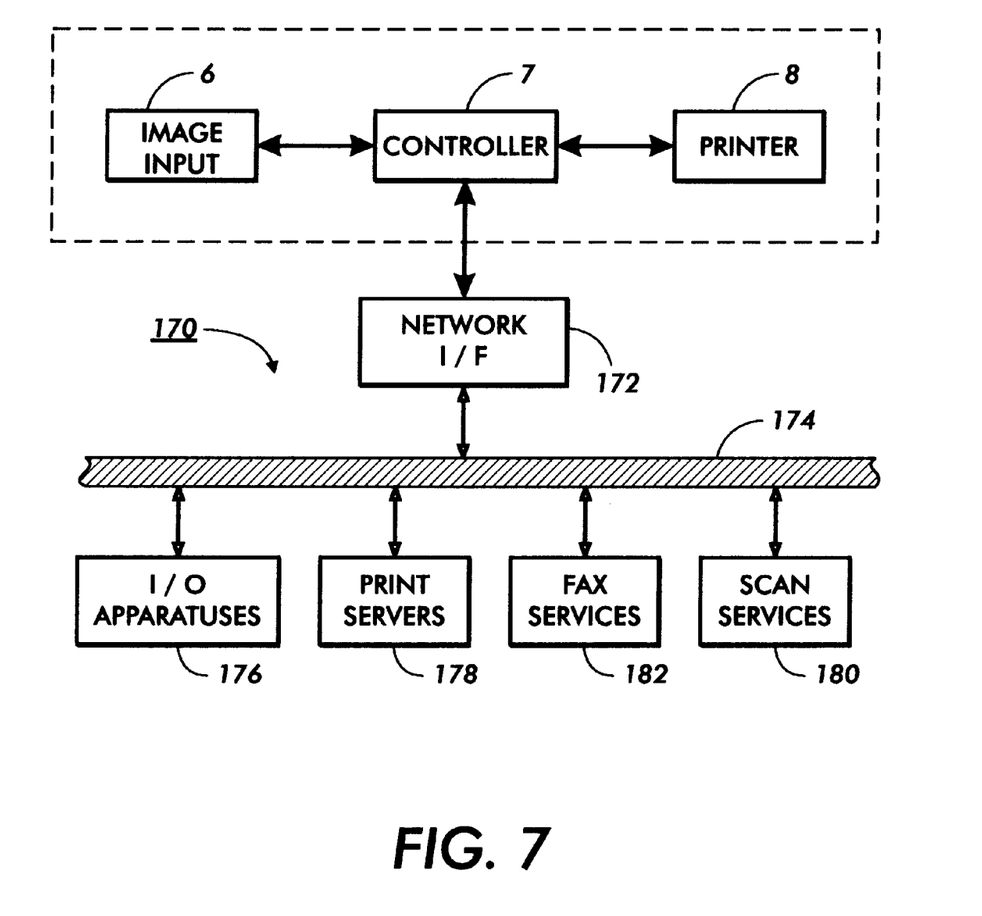
FIG. 7 is a block diagram depicting a network printing system including the printing system of FIG. 2.

Referring to FIG. 7, the controller is coupled with network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware Registered TM from Novell Corp.

In the network arrangement 170, various I/O and storage devices are interconnected with a bus 174. In particular, the devices include, among others, the following: I/O Apparatuses 176, Print Services 178, Scan Services 180 and FAX Services 182. In the present example a given I/O Apparatus may include a telephone and/or a workstation, such as any suitable PC compatible apparatus. In one example, the telephone, PC and FAX capability is provided by an integrated digital apparatus, such as that manufactured by Canon Corp. under the series name of "Navigator HD40". While in this example, the telephone is digitally based so that no interface, such as a modem, is required, in other examples the telephone could employ a suitable telecommunications interface without affecting the concept underlying the currently disclosed embodiment.

In one embodiment, the printing system 2 is a DocuTech Network Printing System ("Network Printer") which prints jobs transmitted from one of the I/O apparatuses 176, such as a Xerox 6085 workstation. In one embodiment, the Network Printer processes network jobs written in a page description language ("PDL") known as "Interpress" and as a prerequisite, to printing the network job, the Network Printer decomposes the job from a high level primitive form to a lower level primitive form. In another embodiment the Network Printer is used, in conjunction with a DocuTech Network Server, see Print Services 178, to print jobs written in, among other PDLs and Postscript. Decomposed jobs are commonly stored, for output, in a job file (not shown) of the Network Printer and later transferred to a suitable print queue for printing.

Preferably, the Scan Service 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives for a job, such as printing and/or finishing instructions. Finally, the FAX Service 182 assumes the form of any suitable networked FAX device, such as the LAN FAX Service manufactured by Xerox Corporation under the 7032 series.

It should be appreciated that there are situations in which a user wishes to develop a job even when all of the input for the job is not currently available. Portions of the job may not be available because, among other reasons, pages/images are still being produced or delivered, e.g. photographs are being developed and printed, or pages/images may exist in non-scanable formats, such as pre-printed material, electronic images, or variable data from data bases. Alternatively there may be reasons why it is desirable to segment a job using page/image placeholders even though all the input is actually available. For instance, some pages/images may require different image process settings for optimum image quality, some pages/images may require different paper handling modes (recirculating document handlers as opposed to platen handling), and some pages/images may require different format scanners (document scanner versus transparency scanner). The following description is directed toward an approach which permits users of printing systems to create and manage page/image placeholders (logical tags) with any job during job structure creation.

The concept of the preferred embodiment, which will be described in further detail below, includes providing printing systems users with the following conceptual components: first, the user is provided with a vehicle for creating page/image placeholders within a job during the creation of that job. Page placeholders could be created by for example, scanning and interpreting information from a placeholder sheet encountered in a document stack—the information could assume any variety of machine readable forms, such as bar code or glyph—or manual programming of a variable number of page placeholders. Additionally, an image placeholder would, in one illustrated example, be created by scanning and interpreting information from an area where an image is to be placed.

Second a frame work for managing the page/image placeholder would be provided. Management operations could include: add, move, copy, review, and/or delete operations. Finally, a system would be provided for detecting potentially invalid combinations of operations on jobs with unresolved image/page placeholders. In one instance of such detecting, a job containing page/image placeholders would be proofed and detected invalid combinations would prompt an exception to be reported to a user.

As contemplated, a placeholder page (which, as will appear, could be in hardcopy or electronic form) may contain a description of the page to be added (e.g. description of image) and corresponding instructions could be written or printed in the form of machine readable characters or structural information. Deferred page inserts could be saved with any job for subsequent printing and deleted when no longer required. Placeholders, in the preferred embodiment, would not affect job structuring instructions, such as chapter starts, and would remain with the job when the job is stored or transmitted electronically.

Figure 8:
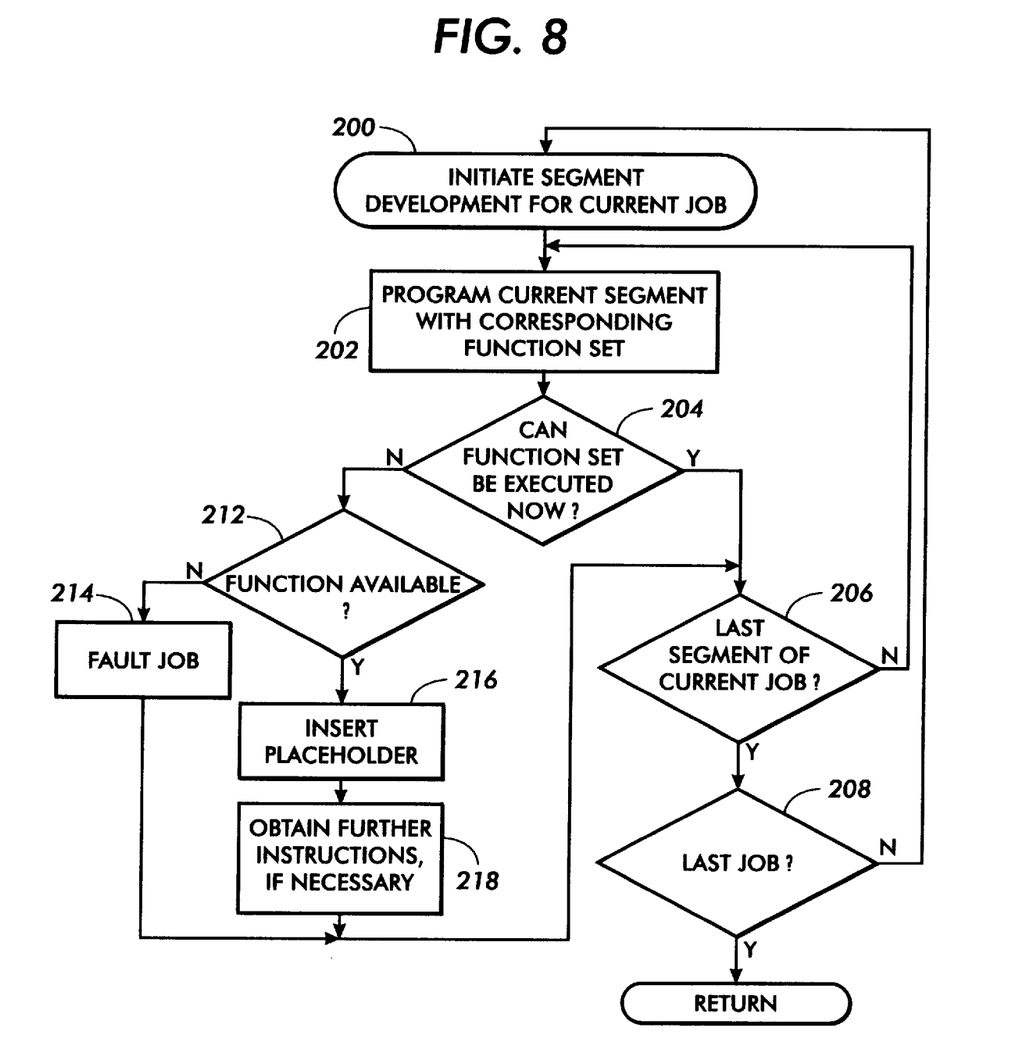
FIG. 8 is a flow diagram depicting a process for programming a job with one or more placeholding "sheets"

Referring specifically to FIG. 8 an approach of developing a job placeholder is discussed. Before proceeding, it should be recognized that jobs are often programmed in terms of segments so that a given instruction may apply to a segment of one or more pages. Additionally, job programming is often performed on a segment-by-segment basis. At step 200, segment development for a current job is initiated and one or more pages of the current segment is programmed, at step 202, with a corresponding function set. As will appear, the function set may relate to, among other functions, document scanning, image processing, editing, document handling, and/or bitmap merging. As should be recognized, certain function sets for a given job segment may not be executable at the time the corresponding job is being initially developed (see step 204). Hence, a determination is made at step 204 as to whether a function set is currently executable.

If a given functions set is currently executable, then a check is performed at step 206, and the process loops back to step 202 if further segment programming is required. If all of the segments for a job have been programmed, then a check is performed at step 208 to determine if segment development for another job is in order.

Assuming that a function set for a given segment cannot be executed, then the process proceeds to step 212 where a check is performed to determine whether the function can be made available in the future. If the function is not available, then the job is faulted (step 214); however, the system is biased toward making a placeholder (i.e. passing to step 216) unless it is clear that the function called for by step 202 cannot, under any circumstances, be made available. This approach is dictated by the assumption that while functions may not be available currently, they may be available at a later time.

If the function is available, then a placeholder with a set of placemarking instructions is generated at step 216. Examples regarding the development of placeholders or separator pages may be obtained by reference to U.S. Pat. No. 4,970,554 to Rourke. Assuming the process proceeds through step 216, further instructions may be required to implement a currently programmed function set (step 218). In one instance, further instructions may be solicited by way of a pop-up dialog requiring alternative instructions or parameters. Subsequent to performing step 218, the process proceeds to step 206 for determining if any further segments require programming.

Figure 9:
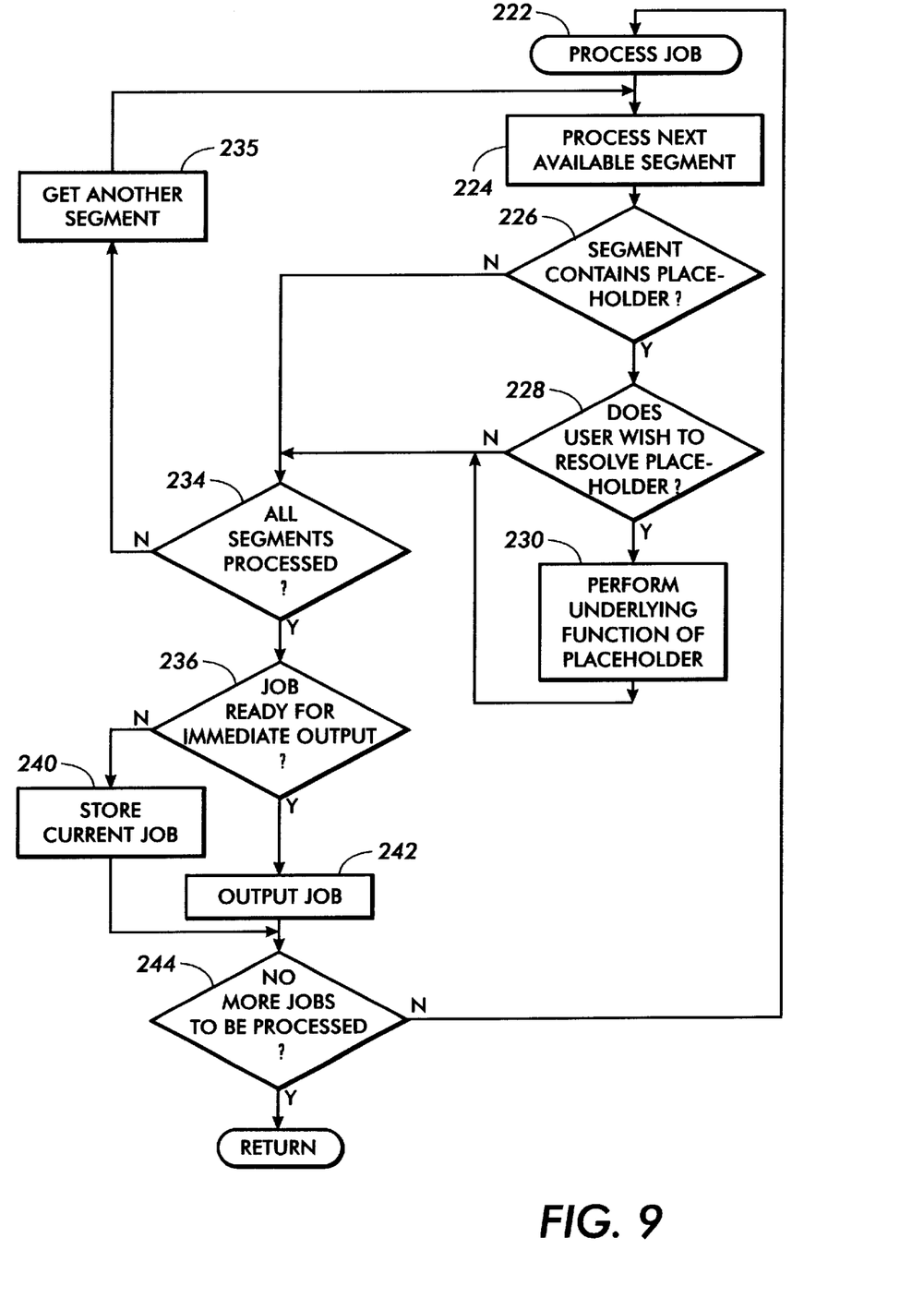
FIG. 9 is a flow diagram depicting a manner in which a job with a placeholder is processed.

Referring to FIG. 9 an approach for processing placeholders is discussed. At step 222, processing of a job on a segment-by-segment basis is initiated so that the next available segment is, via step 224, processed. If the next available segment contains a placeholder (step 226) a user or process is, at step 228, provided with the opportunity to "resolve" the placeholder. In one example, a process, instead of a user, could be used to initiate a process. Pursuant to step 228, the user may perform an underlying function of the placeholder (step 230) and then process any further segments if necessary (steps 234 and 235).

Assuming that a segment of a given job does not include a placeholder and all of the segments of the job have been processed (see step 234) a determination is made, at step 236, as to whether the job is ready for immediate output. Depending on a user's choice at step 236, the job in process can either be stored (step 240) or prepared for output (step 242), e.g. printing. In one example, a user may defer to have the "choice" made automatically so that the job can be printed automatically for proofing at selected stages of job development. The role of proofing in the preferred embodiment is discussed in further detail below. If it is determined, at step 244, that no more jobs are to be processed then a Return is executed, otherwise the process loops back to step 222 where another job is processed in accordance with the approach of FIG. 9.

Various aspects of the above-described approach will follow from the description below:

In a first aspect, a system for providing a job with a set of "delayed instructions" is made available. To implement such a system, a set of "encoded" instructions is communicated, via one or more "sheets" to a capture subsystem of a printing system along with an attendant job or document. For a case in which a hardcopy job is being processed, a placeholding sheet is integrated with a document (as described, for example, in U.S. Pat. No. 4,970,554 to Rourke) and when the sheet is read by an image reading device (e.g. scanner), the instructions provided by the placeholding sheet are deferred for employment with the job in anticipation of printing. It should be appreciated that the encoded instructions can be provided in various forms other than hardcopy, such as in the form of an electronic page written in a page description language. For a case in which an electronic job is being processed from a network, an electronic page, representative of a placeholding sheet, is interpreted and the instructions obtained therefrom may be employed in processing the electronic job.

As will be appreciated by those skilled in the art, the delayed instructions can assume a wide variety of forms, which delayed instructions may include settings to be used by the printing system pursuant to processing of one or more images. In one example, the delayed instructions correspond with image processing to be performed on one or more pages of the job. To more fully appreciate how delayed instructions would operate in this context, reference is made to U.S. Pat. No. 5,493,634 to Bonk et al. ("Bonk Patent"), the disclosure of which is incorporated herein by reference. In view of Bonk, an image, subsequent to capture thereof, can be transmitted to a coalescing section so that predesignated image processing operations can be performed thereon.

In another example, the delayed instructions correspond with image manipulation to be performed on the job. In the event of image manipulation, parameters for use in controlling, among other operations, halftone operations may be set. Additionally, image manipulation algorithms, such as the one disclosed in now allowed U.S. patent application Ser. No. 08/624,276 to Robinson, the disclosure of which is incorporated herein by reference, may be implemented with the delayed instructions.

In another example, the delayed instructions correspond with editing and/or merging instructions to be employed with the job. When editing instructions are being employed, user intervention may be desirable. Accordingly, the delayed instructions may include a prompt which indicates to the user a need to perform an operation on an image with a user interface. Additionally, the prompt would preferably include a dialog having at least an appropriate set of default edit settings (e.g. cut and paste dimensions) shown therewith.

When a merge operation is being employed it is useful to predefine a dialog such as one of the dialogs shown in U.S. Pat. No. 5,309,558 to Rourke et al. In a merge operation, it is also desirable to include instructions indicating a path for the memory location of the merge item to be used in the merge operation. Use of merge items resident at a network location is contemplated in the preferred embodiment.

In yet another embodiment, a placeholder would correspond with insertion instructions to be used pursuant to a finishing operation or a sheet insertion routine. An insertion instruction, among other instructions, might indicate the need for structuring a job to receive an insert sheet. Further information regarding structuring a job to insert an insert sheet into the job is disclosed in U.S. Pat. No. 5,489,969 to Soler et al. (Issued: Feb. 6, 1996), the disclosure of which is incorporated herein by reference.

It should be recognized that the "delayed" instructions need only be delayed in the sense that they relate to an operation to be performed subsequent to the scanning or interpreting of the placeholding sheet. That is, an operation indicated by the delayed instructions may be executed while the job with the placeholding sheet or placeholder is actually in progress. In one example, the delayed instructions may designate that a given page is to be processed in a specially designated print media handling mode. The mode could be achieved at either a host system in which the placeholder was read or at a print service remote of the host system (See remote services/devices shown in FIG. 7).

In the event of employing a remote service, certain information would preferably be provided to the remote service. For instance, information regarding the location of the image and a mode to be employed in processing the image would be provided to the remote site. Transmission of instructions across a network is described in detail in U.S. Pat. No. 5,130,806 to Reed et al., the disclosure of which is incorporated by reference herein. Additionally, in one embodiment, an image generated at the remote service would be "tagged" for recognition at the host device. As will appear from the description below, this tag would permit the image to be integrated at a location designated by a placeholder stored with a corresponding job.

As will be appreciated use of a remote service or apparatus (FIG. 7) could be particularly effective in obtaining remote network scanning. In a remote scanning embodiment, a hardcopy image would be, pursuant to reading the delayed instructions, provided at a remote scanning device and developed for transmission back to the host system with a suitable tag. This could be particularly advantageous when a scanner with a greater resolution than that available at the host resides at the remote site. It will also be understood that an advantage could be obtained when the host system does not actually include a scanner.

In a second aspect, the placeholder would be employed to provide a "mark" as to where a currently unavailable image is to be placed in a stored job. As with images from remote sources (see description above), an image with a tag or identifier would be provided to the host system subsequent to reading the placeholder. The identifier would indicate which job with which the remote image is linked. It is contemplated that the remote image would then be linked with the job through use of a suitable reference. In one example the reference would be set up in advance through use of a subset of global instructions (See Bonk Patent referenced above for a definition of "Global Instructions"). That is, the global instructions would include a reference to the identifier and a pointer indicating where the image should be positioned in the job. It will be appreciated that the placeholder corresponding with the remote image could be provided with further processing instructions so that a variety of operations could be performed on the referenced image prior or pursuant to printing. For instance, the image could be processed to enhance image quality, inserted into an electronic page (via an editing operation) and then manipulated pursuant to printing.

Due to the nature of delayed instructions, a job may be stored without certain information, such as an image necessary to complete production of the job. It has been found that proofing of a job with one or more placeholders is optimized when an indication of each placeholder, with corresponding information (e.g. substance of instructions or image(s) associated with the placeholder) is provided. To implement this sort of proofing approach a scheme similar in theory to that used by Microsoft, Inc. in its electronic mail system would be employed. In the Microsoft scheme an attachment is referenced but not actually printed. In a similar vein, the placeholder would be associated with a set information indicating briefly the instructions and/or image(s) to be inserted for the placeholder. In turn, pursuant to proof printing, the information set would be produced in order to obtain an indication as to what operation and/or information is to be provided. By this approach, effective proofing of a job can be achieved since an indicator is provided for each "hole" in the job.

Numerous features of the above-described embodiments will be appreciated by those skilled in the art:

First, segmenting a job can improve operator productivity by reducing the amount of time spent programming exception pages. The operator can scan one portion of a job in one image quality mode and scan other portions in other image quality modes without changing image quality mode page by page.

Second, inserted pages can be assembled, e.g. RIPped, prior to or after job creation thereby allowing customers more flexibility in their workflows. This flexibility can be used to reduce print delivery time if the customer chooses to process various parts of the job in parallel.

Finally, job integrity is improved as follows:

a) System tracking of placeholder pages eliminates human error in placement and the addition of insert pages.

b) Job proofing (proofing for content) with printing of placeholder information is made available. This allows a user to evaluate job content without destroying the integrity of chapter start. Moreover, deferred insert pages can be printed with the job providing a reference for what is missing.

c) By maintaining placeholder information with a stored job, job integrity is maintained even though final inserts are not actually part of the stored job.

What is claimed is:

1. In a document processing system with a subsystem for generating electronic representations of respective images from a set of image data in accordance with a set of control instructions, the set of control instructions including a first subset of control instructions for controlling development of a first image, a second subset of control instructions for controlling development of a second image and a subset of image placemarking instructions, a method of developing a job for output with an output subsystem, comprising:

(a) at a first time, generating a first electronic representation of the first image, with the generating subsystem, by reference to the first subset of control instructions;

(b) at a second time, reading the subset of image placemarking instructions with the generating subsystem, wherein the second time is after the first time and wherein the placemarking instructions mark the location of an electronic representation of an image to be received by the document processing system at a future time;

(c) at a third time, generating a second electronic representation of the second image, with the generating subsystem, by reference to the second subset of control instructions, wherein the second time is after the first time but before the third time; and (d) at a fourth time, electronically performing a selected function relative to a third electronic representation of a third image in response to said reading of (b), wherein the fourth time is at a future time after the first, second and third times and prior to the output of the job.

2. The method of claim 1, in which each said first electronic representation and each said second electronic representation is processed with a first set of image processing settings and in which the third electronic representation is processed with a second set of image processing settings, wherein said (d) includes providing the second set of image processing settings by reference to the subset of image placemarking instructions.

3. The method of claim 1, in which the document processing system includes a memory and the generating subsystem includes a rasterizing subsystem for converting the first and second images into the respective first and second electronic representations, further comprising storing the first and second electronic representations in said memory, along with the subset of image placemarking instructions, prior to the fourth time.

4. The method of claim 3, wherein said (d) includes receiving, at the document processing system, the third electronic representation corresponding with the third image and storing the third electronic representation in said memory, along with the first and second electronic representation, in a manner dictated by the placemarking instructions of the subset of image placemarking instructions.

5. The method of claim 1, further comprising producing a set of proof prints based on the first image, the second image and the subset of image placemaking instructions, said producing being performed prior to the fourth time.

6. The method of claim 1, in which a first print and a second print are produced with the first electronic representation and the second electronic representation, respectively, wherein said (d) includes providing an insert sheet with the third image for combination with the first and second prints by reference to the subset of image placemaking instructions.

7. The method of claim 1, in which an editing function is performed on or with the third image, wherein said (d) includes providing editing instructions through the subset of image placemarking instructions.

8. The method of claim 1, in which the document processing system includes a document handling device with the document handling device being operable in a first document handling mode and a second document handling mode, and in which the first, second and third electronic representations are obtained respectively from first, second and third hardcopy sheets, further comprising:

processing the first and second hardcopy sheets, with the document handling device, in the first document handling mode;

processing the third hardcopy sheet, with the document handling device, in the second document handling mode, wherein said (d) includes providing instructions, in the subset of image placemarking instructions, directing a user to process the third hardcopy sheet in the second document handling mode rather than the first document handling mode.

9. In a document processing system with a subsystem for generating electronic representations of respective images from a set of image data in accordance with a set of control instructions, the set of control instructions including a first subset of control instructions for controlling development of a first image, a second subset of control instructions for controlling development of a second image and a subset of image placemarking instructions, a method of developing a job for output with an output subsystem, comprising:

(a) at a first time, generating a first electronic representation of the first image, with the generating subsystem, by reference to the first subset of control instructions;

(b) at a second time, reading the subset of image placemarking instructions with the generating subsystem, wherein the second time is after the first time and wherein the placemarking instructions mark the location of an electronic representation of an image to be received by the document processing system at a future time;

(c) at a third time, generating a second electronic representation of the second image, with the generating subsystem, by reference to the second subset of control instructions, wherein the second time is after the first time but before the third time; and (d) at a fourth time, providing a third electronic representation of a third image by reference to the placemarking instructions, wherein the fourth time is at a future time after the first, second and third times and prior to the output of the job.

10. The method of claim 9, further comprising electronically performing a selected function relative to the third image in response to said reading of (b).

11. The method of claim 9, in which the document processing system includes an image capture device for converting a hardcopy representation of an image to an electronic representation of the image, wherein said (a) and (c) and (d) include obtaining the first, second and third electronic representations respectively from first, second and third hardcopy representations at the image capture device.

12. The method of claim 9, in which the document processing system includes a first image capture device and a second image capture device, the first image capture device and the second image capture device converting a hardcopy representation of an image to an electronic representation of the image, wherein said (a) and (c) include obtaining the first and second electronic representations respectively from first and second hardcopy representations at the first image capture device, and said (d) includes obtaining the third electronic representation at the second image capture device, and wherein an instruction to obtain the third electronic representation at the second image capture device is provided in the subset of image placemarking instructions.

13. The method of claim 9, in which the generating subsystem is disposed in a host printing system and the host printing system communicates with a remote system by way of a network connection, wherein said providing of the third electronic representation of the third image includes creating the third image at the remote system.

14. The method of claim 13, further comprising retrieving the third electronic representation from the remote system with the host printing system at the fourth time.

15. The method of claim 14, further comprising performing a selected function relative to the third image at a fifth time with the fifth time being subsequent to the fourth time.

16. The method of claim 13, further comprising:

storing the first and second electronic representations at first and second memory locations, respectively; and storing the third electronic representation at a third memory location, wherein the third electronic representation is stored relative to both the first and second electronic representations in a preselected order dictated by the subset of image placemaking instructions.

\* \* \* \* \*